US010393921B2

(12) United States Patent
Cuny et al.

(10) Patent No.: US 10,393,921 B2
(45) Date of Patent: Aug. 27, 2019

(54) METHOD AND SYSTEM FOR CALIBRATING A DISTRIBUTED VIBRATION SENSING SYSTEM

(71) Applicant: Schlumberger Technology Corporation, Sugar Land, TX (US)

(72) Inventors: Theo Cuny, Southampton (GB); Alexis Constantinou, Southampton (GB); Paul Dickenson, Southampton (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 73 days.

(21) Appl. No.: 15/267,347

(22) Filed: Sep. 16, 2016

(65) Prior Publication Data
US 2017/0075029 A1    Mar. 16, 2017

Related U.S. Application Data
(60) Provisional application No. 62/219,185, filed on Sep. 16, 2015.

(51) Int. Cl.
*G01V 1/52* (2006.01)
*G01V 13/00* (2006.01)
(52) U.S. Cl.
CPC .............. *G01V 13/00* (2013.01); *G01V 1/52* (2013.01)
(58) Field of Classification Search
USPC .......................................................... 73/866
See application file for complete search history.

(56) References Cited

U.S. PATENT DOCUMENTS

| 6,778,720 B1 | 8/2004 | Cekorich et al. |
| 7,946,341 B2 | 5/2011 | Hartog et al. |
| 8,225,867 B2 | 7/2012 | Hartog et al. |
| 8,312,923 B2 * | 11/2012 | Patel .......... E21B 17/028 166/250.01 |

(Continued)

FOREIGN PATENT DOCUMENTS

| GB | 2222247 A | 2/1990 |
| GB | 2442745 B | 6/2011 |

(Continued)

OTHER PUBLICATIONS

Hartog et al., "The Optics of Distributed Vibration Sensing," Second EAGE Workshop on Permanent Reservoir Monitoring 2013, Jul. 3, 2013, Stavanger, Norway.

(Continued)

*Primary Examiner* — Peter J Macchiarolo
*Assistant Examiner* — Mohammed E Keramet-Amircolai
(74) *Attorney, Agent, or Firm* — Sara K. M. Hinkley

(57) ABSTRACT

A method for calibrating a distributed vibration sensing system includes applying a localized calibration event, such as a temperature change, to at least one location along an optical fiber cable. Backscattered light generated the optical fiber while the localized calibration event is applied includes phase information having low frequency components. The center of energy of the low frequency components can be identified in order to generate a reference point along the fiber that can be used to generate a channel-depth calibration scale that can be applied to vibration data acquired from the fiber when used in various applications, such as borehole seismic surveying.

12 Claims, 7 Drawing Sheets

(56) References Cited

U.S. PATENT DOCUMENTS

| | | | |
|---|---|---|---|
| 8,347,958 B2 | 1/2013 | Hartog et al. | |
| 8,605,542 B2 | 12/2013 | Coates et al. | |
| 9,169,697 B2* | 10/2015 | Palmer | E21B 29/00 |
| 9,175,523 B2* | 11/2015 | Patel | E21B 17/028 |
| 2006/0010973 A1* | 1/2006 | Brown | E21B 47/1005 |
| | | | 73/204.11 |
| 2010/0101786 A1* | 4/2010 | Lovell | E21B 17/028 |
| | | | 166/250.01 |
| 2010/0300678 A1* | 12/2010 | Patel | E21B 17/028 |
| | | | 166/65.1 |
| 2012/0067118 A1 | 3/2012 | Hartog et al. | |
| 2013/0192851 A1* | 8/2013 | Algeroy | E21B 47/122 |
| | | | 166/382 |
| 2014/0052377 A1* | 2/2014 | Downie | G01V 1/40 |
| | | | 702/11 |
| 2014/0150523 A1* | 6/2014 | Stokely | E21B 47/123 |
| | | | 73/1.82 |
| 2014/0222405 A1* | 8/2014 | Lecerf | E21B 43/00 |
| | | | 703/10 |
| 2014/0231074 A1* | 8/2014 | Adil | E21B 47/065 |
| | | | 166/250.01 |
| 2014/0236357 A1* | 8/2014 | Degrange | E21B 47/124 |
| | | | 700/275 |
| 2014/0347957 A1* | 11/2014 | Hartog | G01V 1/42 |
| | | | 367/33 |
| 2015/0346370 A1* | 12/2015 | Martin | G01N 29/2418 |
| | | | 73/152.58 |

FOREIGN PATENT DOCUMENTS

| | | |
|---|---|---|
| WO | 2010136809 A2 | 12/2010 |
| WO | 2015183441 A1 | 12/2015 |
| WO | 2016112147 A1 | 7/2016 |

OTHER PUBLICATIONS

Posey et al., "Strain sensing based on coherent Rayleigh scattering in an optical fibre." Electronics Letters Sep. 28, 2000, vol. 36, No. 20, pp. 1688-1689.

* cited by examiner

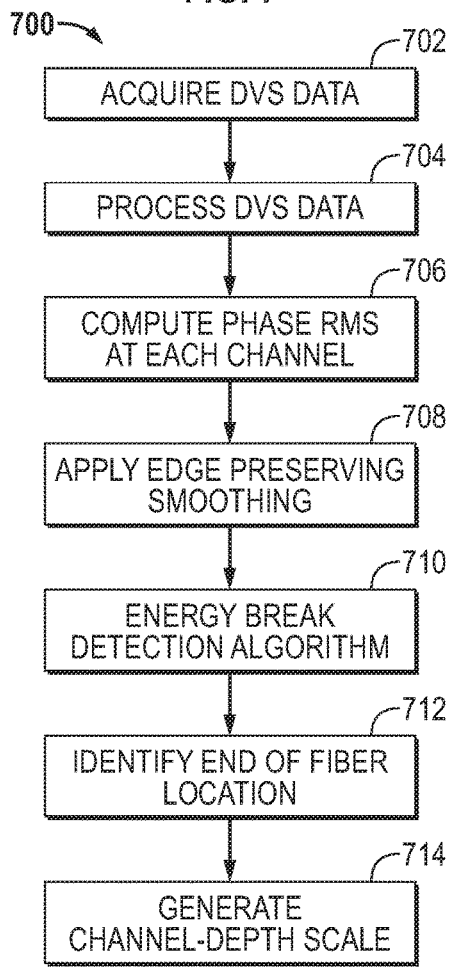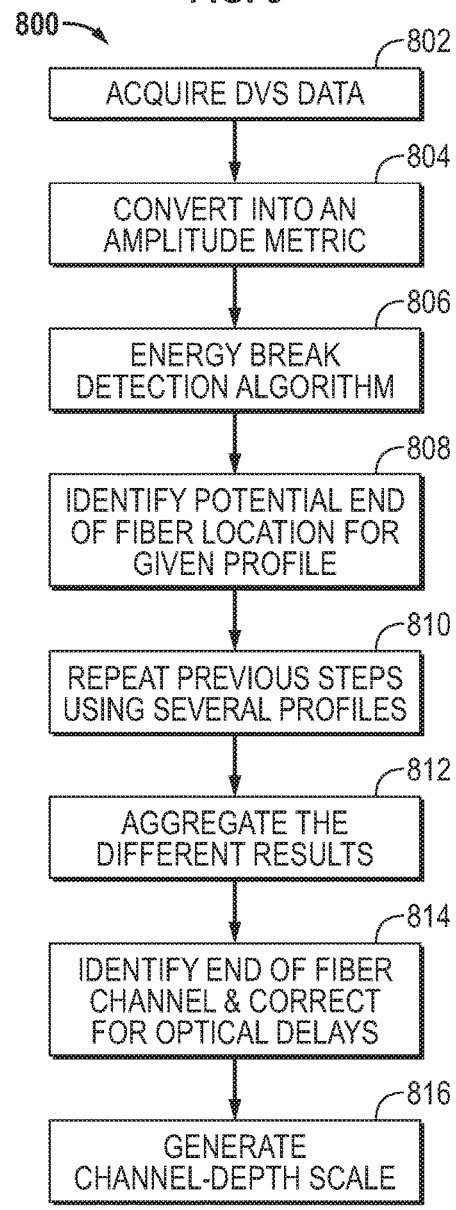

METHOD AND SYSTEM FOR CALIBRATING A DISTRIBUTED VIBRATION SENSING SYSTEM

This application claims the benefit of U.S. Provisional Application Ser. No. 62/219,185, filed on Sep. 16, 2015, which is incorporated by reference herein in its entirety.

BACKGROUND

Fiber optic sensors employ the fact that environmental effects, such as pressure, strain, vibration, and temperature, can alter the amplitude, phase, frequency, spectral content, or polarization of light propagated through an optical fiber. Advantages of fiber optic sensors include their light weight, small size, passive nature, energy efficiency, and ruggedness. In addition, fiber optic sensors have the potential for very high sensitivity, and wide bandwidth. Yet further, certain classes of sensors can be distributed along the length of an optical fiber so that an appropriate interrogation system can be employed to monitor selected environmental parameters at multiple locations at the same time.

One type of distributed fiber optic sensing technique is referred to as distributed vibration sensing (DVS), also known as distributed acoustic sensing (DAS). DVS/DAS techniques employ an optical fiber as a very sensitive, continuous sensor of dynamic strain. In use, the fiber is coupled to vibration which applies strain to the fiber and this converts the fiber into a distributed sensor of mechanical vibration.

One example of the use of DVS/DAS sensor is in vertical seismic profiling. In general, seismic profiling employs seismic sources to generate seismic signals that are propagated into a subterranean structure. The propagated seismic signals are reflected from subterranean elements in the subterranean structure, where the reflected signals are detected by seismic sensors, such as a distributed fiber optic sensor. The data collected by the seismic sensor is then processed to determine characteristics of the subterranean structure. Other applications for DVS/DAS techniques including monitoring noise in a well that is caused by, for example, the movement of fluids and other processes occurring in the well, or by a mechanical equipment permanently or temporarily installed in the well.

SUMMARY

According to various embodiments, a distributed vibration sensing (DVS) system that includes a fiber optic sensor is deployed to monitor acoustic events in a wellbore. A calibration source is positioned at a first location to apply a localized calibration event to the sensor. DVS data acquired from the sensor is processed to detect the calibration event. A first reference point along the sensor that corresponds to the event is determined. A second reference point along the sensor also is determined from the DVS data. A channel-depth calibration scale that can then be applied to DVS data is generated from the first and second reference points.

In another embodiment, the acquired DVS data is processed to identify at least two reference points along the optical fiber sensor. The processing includes processing low frequency components of the DVS data to identify the first reference point by detecting an interface between an environmental condition experienced by the optical fiber sensor above the wellhead and an environmental condition experienced by the fiber optic sensor below the wellhead, and to identify a second reference point corresponding to a known depth of a far end of the optical fiber sensor in the wellbore.

In an embodiment, a distributed vibration sensing (DVS) system is provided that includes an optical fiber disposed in a borehole to monitor acoustic events, an optical source to launch optical signals into a launch end of the optical fiber, and a detector to detect backscattered light generated by the optical fiber in response to the launched optical signals. The system also includes a calibration source to apply a localized calibration event at a first location along the optical fiber. The localized calibration event is a temperature change. A processing system processes backscattered light that is generated by the optical fiber while the localized calibration event is present at the first location in order to determine a channel-depth calibration scale for the optical fiber.

In another embodiment, the processing system processes the backscattered light that is generated by the optical fiber in order to identify at least a first reference point and a second reference point along the length of the optical fiber. In this embodiment, the first reference point corresponds to a wellhead of the well and the second reference point corresponds to the far end of the optical fiber. The first reference point is identified by detecting a difference between an ambient condition experienced by the optical fiber above and below the wellhead. The first and second reference points again are used to generate a channel-depth calibration scale to determine a depth of an acoustic event monitored by the optical fiber.

BRIEF DESCRIPTION OF THE DRAWINGS

Certain embodiments of the invention are described with reference to the accompanying drawings, wherein like reference numerals denote like elements. It should be understood, however, that the accompanying drawings illustrate only the various implementations described herein and are not meant to limit the scope of various technologies described herein. The drawings show and describe various embodiments of the current invention.

FIG. 7 is an example of a process flow for generating a channel-depth calibration scale, according to an embodiment.

FIG. 8 is an example of a process flow for generating a channel-depth calibration scale, according to an embodiment.

DETAILED DESCRIPTION

Figure 1:
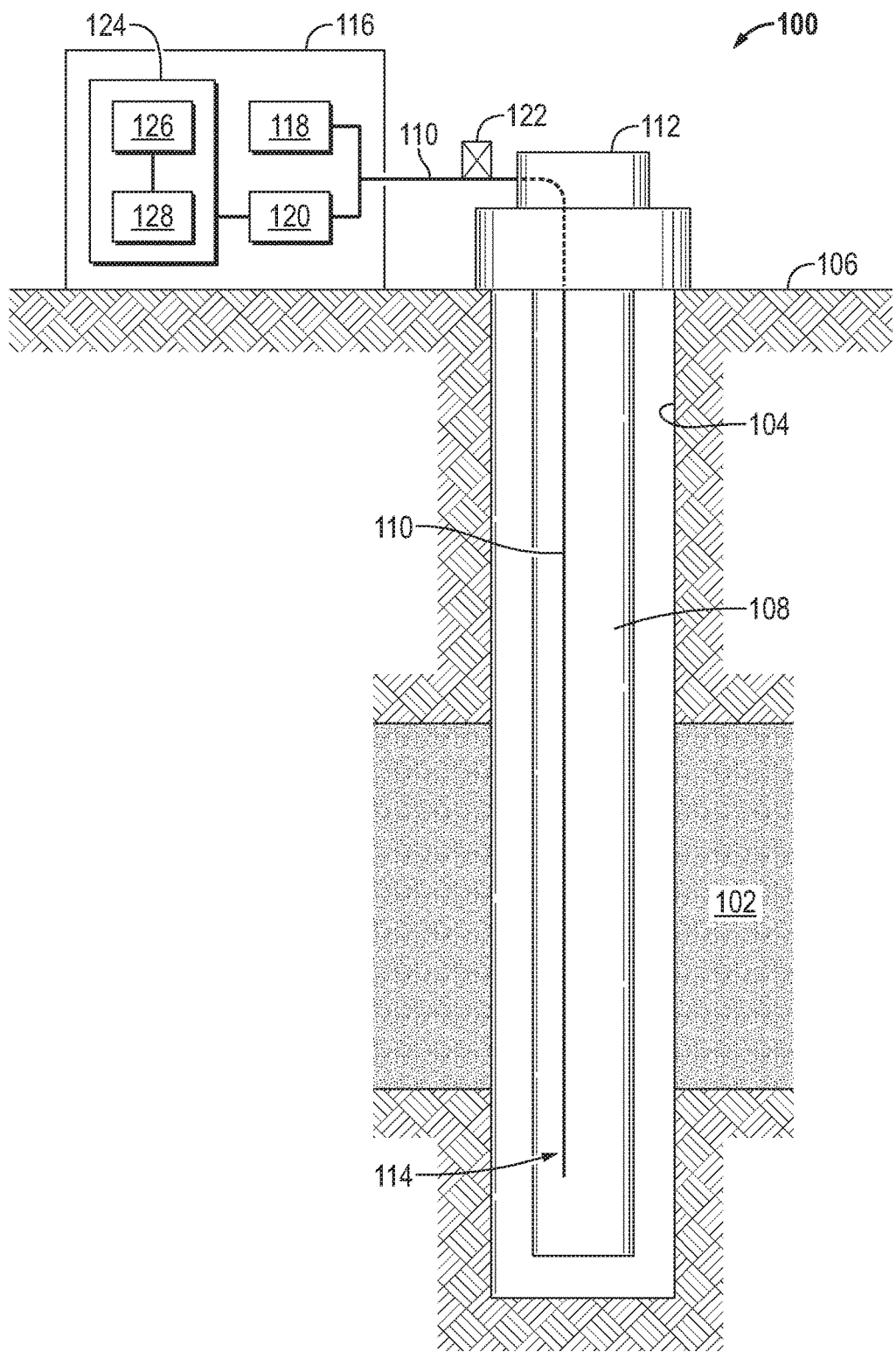
FIG. 1 is a cross-sectional schematic view of a distributed vibration system and optical fiber sensor deployed in a borehole, according to an embodiment.

In the following description, numerous details are set forth to provide an understanding of the present invention. However, it will be understood by those skilled in the art that the present invention may be practiced without these details and that numerous variations or modifications from the described embodiments may be possible.

In the specification and appended claims: the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down", "upper" and "lower", "upwardly" and "downwardly", "upstream" and "downstream"; "above" and "below"; and other like terms indicating relative positions above or below a given point or element are used in this description to more clearly describe some embodiments of the invention.

Distributed fiber optic sensors can be used in many different applications, including seismic profiling and monitoring of fluid flow or various other processes occurring in a well. In general, measurements are made using fiber optic sensors by detecting returned light that is scattered by naturally-occurring reflective features in the fiber in response to a probe signal, and can be based on spontaneous Raman scattering, stimulated Brillouin scattering, or Rayleigh scattering.

For DVS/DAS systems that rely on Rayleigh scattering, the interrogation system generally includes a narrowband laser to launch a probe pulse into the optical fiber. The narrowband pulse results in interference between backscattered light returned from different parts of the fiber that are occupied by the probe pulse at any one time. This is a form of multi-path interference and gives rise to a speckle-like signal in one dimension (i.e., along the axis of the fiber). This backscatter signal is referred to as coherent Rayleigh noise or coherent backscatter. The interference modulates both the intensity and the phase of the backscattered light. Minute changes (much less than a wavelength) in the length of a section of fiber are sufficient to radically alter the value of the amplitude (which is proportional to the square root of the intensity) and phase of the returned signal, thus enabling detection of very small changes in the strain experienced by the fiber.

The amplitude and the phase of the backscattered signal, measured locally to any position along the fiber, have a highly non-linear relationship to the applied strain. To obtain a more linear transfer function, techniques can be used to measure the phase difference across a length of fiber. For example, the phase difference can be measured in either the electrical or digital domain by mixing the backscattered light with a local oscillator. This mixing converts the backscattered light, including its phase, down to a frequency that can be captured electronically. The phase difference can then be calculated in the digital domain or by an analog phase-measuring circuit prior to digitization.

Yet other DVS/DAS acquisition techniques involve comparing the backscattered light returned from two separate locations along the fiber in the optical domain using a phase-sensing interferometer. According to this technique, the interferometer includes a delay-line fiber that results in the mixing at the detector of the backscattered light returning from the two separate locations along the fiber. Yet another technique involves launching pairs of probe pulses into the fiber that are separated by a defined frequency and launching time. This interrogation technique results in two sets of backscattered signals at different frequencies that combine at the detector to form a beat frequency. The backscatter signals arriving at the detector of course have been scattered from slightly different locations in the fiber. Yet another technique involves modulating the phase of one of a pair of probe pulses such that the phase of the second pulse, relative to that for the first pulse, is varied in a pre-defined manner on each repetition of the pulse sequence. As an example, the relative phase of the pulses can be shifted by a quarter of a cycle between repetitions of the pulse sequence.

Regardless of the interrogation and acquisition technique that is employed with the DVS/DAS system, the signal that is backscattered depends on the strain that is experienced by the fiber. Thus, as an example, a seismic wave propagating in the region of the fiber can be detected. When the fiber is interrogated at frequencies that are much higher than seismic frequencies (e.g., 10 kHz), then the data obtained in response to a single interrogating pulse can be considered a snap shot of the seismic wave. For each pulse launched, the backscattered light can be measured in regular time samples, which are associated with locations along the fiber, called channels.

If the DVS/DAS data is to be useful, the channels must be linked to an actual physical location, such as a depth in a well or a particular position along a structure. In general, channel spacing is defined by the sampling rate of the backscattered light. However, linking each channel to a physical location in order to convert the DVS/DAS measurement to a calibrated depth (or location) scale can be challenging. Without a calibrated scale to use with the data acquired from the optical fiber, the channel-depth relationships for seismic data, fluid flow profiles and reflector images are difficult to generate.

When the optical fiber is evenly distributed along a structure that will be monitored (e.g., a well), then a channel-depth scale can be derived based on knowledge of two reference points along the optical fiber. In general, for borehole applications, the first reference point can be the far end of the optical fiber in the borehole. The second reference point can be the wellhead. The locations of each channel then can be assigned using linear interpolation between the two known reference points. However, determining two reference points often can be difficult, making any type of calibrated scale based on interpolation between the two points unreliable.

In general, the far end of an optical fiber can be readily detected in the vibration data based on a discernible transition in DVS/DAS data when going from real data obtained from locations along the length of the fiber and non-real data obtained from locations that are outside the fiber's range. Detection of the location of the end of the fiber can be facilitated using various techniques that will be described in detail below. However, there is nothing obvious in the DVS/DAS data to identify another physical location, such as the wellhead for example.

When the fiber is almost evenly distributed in the borehole (or along another structure), then if the absolute depth of the free end of the fiber is known, only one other reference point is needed in order to derive a channel-depth (or channel-location) scale. However, when the fiber is subject to an unknown distribution in the borehole (or along another structure), then at least two reference points along the fiber (e.g., one at the top of the well and the other at the bottom of the well) are needed to generate a reference depth scale and, thus determine the actual location of any event detected in the analysis of the DVS/DAS data.

Accordingly, embodiments described herein employ a channel-depth calibration system to identify a specific location along an optical fiber that can be used as a reference point to calibrate the DVS/DAS data. In one embodiment, the calibration system can include a localized vibration source that is deployed at a known location proximate a cable (or other conduit) that carries the optical fiber sensor. Activation of the vibration source applies a varying strain along the fiber that is localized at the known location. This strain can be detected using a DVS/DAS interrogation and acquisition system, enabling determination of a specific location along the length of the fiber and, hence, a channel-depth (or channel-location) calibration scale. The vibration source can generate a vibration signal that is outside the frequency range (e.g., seismic range, acoustic range) in which the fiber optic sensor normally will be used.

In another embodiment, the calibration system can include a localized thermal source that is deployed at the known location. When activated, the thermal source causes a strong thermal change at the known location which is experienced by the cable. This temperature change can be detected in the processed DVS/DAS data, again enabling generation of a channel-location calibration scale. In yet another embodiment, the interface between two environments is detected in the DVS/DAS data based on a marked change in the ambient thermal or vibration content in the region in which the fiber optic sensor is deployed, again enabling determination of one or more specific locations along the length of the fiber and, thus, for generating a channel-location calibration scale.

In any embodiment, the location of the far end of the fiber can also be identified from the DVS/DAS data to provide a second reference point that can be used to generate the channel-depth calibration scale.

The features of embodiments of systems and techniques for generating a channel-depth calibration scale will be described herein with reference to a borehole seismic application. It should be understood, however, that the systems and techniques also can be employed in applications other than for borehole seismic measurements, including in applications other than in a borehole.

Turning now to FIG. 1, a cross-sectional, schematic representation of a well 100 that penetrates a subterranean formation 102 is shown. The well 100 is formed by drilling a borehole 104 through the surface 106 so that it penetrates the subterranean formation 102. A casing 108 can then be lowered and set in place. In FIG. 1, a fiber optic cable 110 is deployed in the well 100 for use in a borehole seismic application. The cable 110 extends through a wellhead 112 and terminates at a far end 114 at a depth in the borehole 104. Although a cased well structure is shown, it should be understood that embodiments of the invention are not limited to this illustrative example. Uncased, open hole, gravel packed, deviated, horizontal, multi-lateral, deep sea or terrestrial surface injection and/or production wells (among others) may incorporate the systems and techniques as described. Further, the fiber optic cable 110 can be permanently installed in the well 100 or can be removably deployed in the well, such as for use during remedial operations.

The fiber optic cable 110 includes an optical fiber contained within a casing or a conduit (e.g., a control line). The fiber optic cable 110 may be longer than only the portion that is disposed within the borehole 104 such that the length of the optical fiber does not correspond with a particular depth in the borehole. As shown in FIG. 1, the fiber optic cable 110 is coupled to a surface DVS/DAS interrogation and acquisition system 116, which is arranged to acquire DVS/DAS data from the optical fiber 110 using any suitable technique, such as any of the interrogation and acquisition techniques described above. To that end, the system 116 includes an optical source 118 (e.g., a coherent narrowband laser) to generate an optical signal (e.g., one or more pulses) to launch into the fiber 110, such as through a circulator. The system 116 also includes an optical receiver/detector 120 (e.g., a photodetector) to detect backscattered light generated by the fiber 110 in response to the interrogating optical signal.

The arrangement shown in FIG. 1 also includes a calibration source 122 that can be deployed at a known location proximate the fiber optic cable 110 in order to generate and apply a calibration event to the cable 110. In some embodiments, the calibration source 122 can include a temperature source that, when activated, can apply a strong temperature change to the fiber optic cable 110 at a location that corresponds to the known location or depth of the temperature source 122. In other embodiments, the calibration source 122 can be a vibration source that generates a vibration signal that imparts a localized strain on the fiber optic cable 110 at a location that corresponds to a known location or depth of the vibration source 122. The calibration source 122 can be deployed at a surface location, such as at the wellhead 112 as shown in FIG. 1, or it can be lowered into the borehole 104 to a known depth using a suitable transport mechanism, such as a completion string, a casing string, a production string, a test string, coiled tubing, wireline, slickline, etc. In addition to components to generate an interrogating pulse and detect the backscattered light generated by the fiber optic cable 110 in response, the DVS/DAS system 116 at the surface includes a processing system 124 having one or more processing devices 126 and memory devices 128 to process the DVS/DAS data and to determine the channel-location calibration scale. In other embodiments, the DVS/DAS data acquired by the system 116 can be processed at a remote location to determine the channel-depth calibration scale that should be used with the DVS/DAS data.

In an embodiment, the calibration source 122 includes a temperature source to induce a thermal change to a localized portion of a conduit that contains the optical fiber. As examples, the conduit can be the outer jacket of the cable that contains the fiber or a pipe, tubing, or control line in which the optical fiber is deployed. When the calibration source 122 is deployed at the surface 106, the temperature source can be a pipe freezing kit or a heating element (e.g., a resistance wire, a heater coil), as examples. In applications in which the source 122 is conveyed to a known depth in the borehole 104, the temperature source again can be either a cooling element (e.g., a Peltier element) or a heating element (e.g., a resistance wire, heater coil), as examples, that are packaged to be lowered downhole and that can be remotely activated by control signals transmitted from the surface 106 using a suitable wired or wireless communications medium. Regardless of the location at which the calibration source 122 is deployed, when activated, the calibration event (e.g., a temperature change) induced by the calibration source 122 will cause a noticeable change in the low frequency content of the DVS/DAS data.

If the temperature change induced by the calibration source 122 is strong enough to overcome the ambient vibration and temperature changes that the fiber optic cable 110 otherwise is experiencing, then the temperature change can be tracked with time on the processed DVS/DAS phase. The assumption that the initial thermal change induced by the calibration source is a quasi-punctual event can be physically justified, particularly if the portion of the cable 110 (or pipe containing the optical fiber) that is subjected to the calibration event is significantly smaller than the spatial resolution of the DVS/DAS system 116. Therefore, if the DVS phase processing is zero-phase, even though the calibration event might be smoothed by various steps of the DVS/DAS processing scheme (such as the moving average effect induced by the gauge length), the location of the calibration event will remain at the central point of energy of the signal produced by the DVS/DAS system 116. Thus, using a curve fitting technique, or determining the central point of energy of the DVS/DAS signal, the specific location (and corresponding channel) along the fiber 110 of the calibration event (i.e., the thermal change) can be reliably determined.

Figure 2:
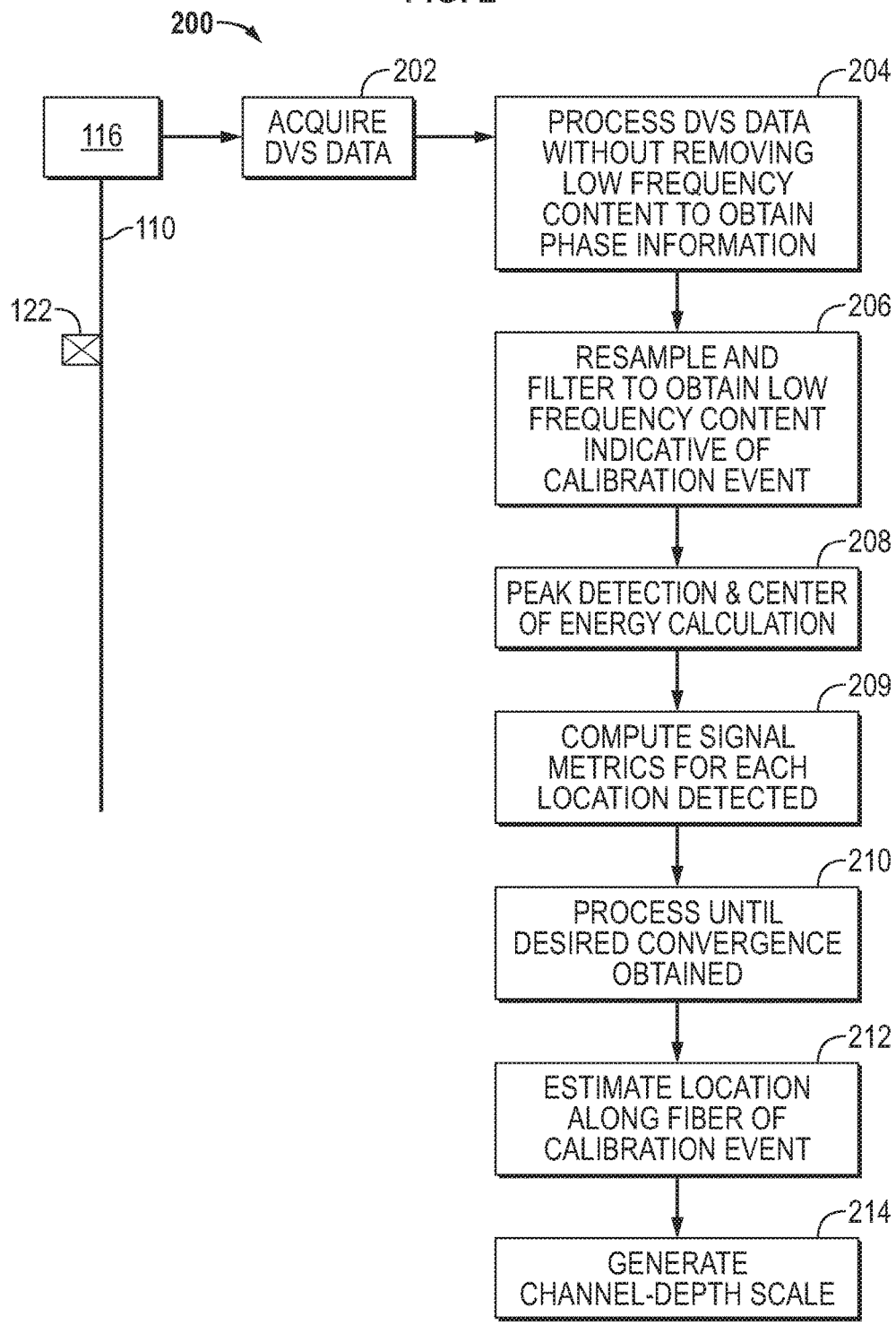
FIG. 2 is an example of a process flow to generate a channel-depth calibration scale, according to an embodiment.

FIG. 2 illustrates an exemplary processing flow 200 that can be used to determine the location along the fiber of the calibration event. In block 202, DVS/DAS data is acquired and processed to obtain phase information using any of the DVS/DAS systems and techniques described above. For example, the DVS/DAS data can be acquired and processed for a borehole seismic or fluid flow application. However, during the processing, the low frequency content of the data (e.g., 2 Hz) is not removed by filtering. At block 206, the resulting phase information (which includes the low frequency content) then is resampled and filtered in a manner that is appropriate to obtain data indicative of the low frequency calibration event (e.g., the thermal change) induced by the calibration source. For each sampling time, the phase profile along the fiber length is then used to determine the potential locations of the calibration event using a peak detection algorithm, refined using a center of energy calculation (block 208). Over time, as the thermal change propagates through the layers of the cable 110 (or pipe) and finally reaches the optical fiber, the signal at the true location of the calibration event will show specific features that will allow its detection from the other thermal signals (block 209). Therefore, for each sampling time, a set of signal metrics can be estimated for each detected center of energy location to quantify such features. At block 210, once a desired level of convergence is obtained, the process flow can be halted. The convergence level is estimated using the signal metrics. At block 212, the location along the fiber optic cable 110 of the detected temperature change can then be provided as an output so that a channel-depth calibration scale can be generated (block 214). Again, this requires consulting the signal metrics to estimate the most likely position for the calibration event (i.e., the temperature change). Information also can be provided regarding the precision of the calculation of the location. The channel-depth scale can then be used to calibrate the DVS data acquired for the particular application (e.g., borehole seismic surveying) in which the system 116 and fiber 110 are deployed in order to identify the location of acoustic events that are monitored by the fiber optic sensor 110.

Figure 3:
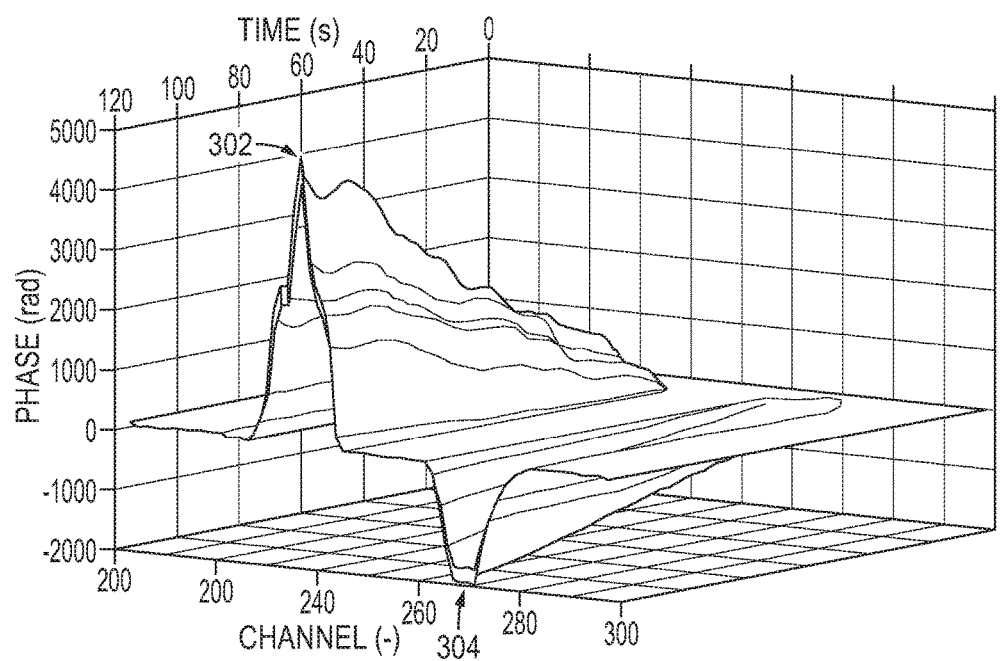
FIG. 3 is an example of a plot to identify the center of energy of low frequency phase components caused by a calibration event, that can be used to identify reference points for a channel-depth calibration scale, according to an embodiment.

FIG. 3 illustrates an example of an output of the processing flow of FIG. 2, which shows the location of the center of energy in the low frequency content of DVS/DAS data that can be used to generate the channel-depth scale. In this example, the acquired data was generated by an optical fiber contained within a metal pipe that was buried under the ground, thus providing a relatively quiet environment for the measurements. The calibration source 122 in this example included a pipe freezing kit that was activated to freeze the metal pipe at two known locations at two different times. In FIG. 3, the y-axis represents phase (rads), the x-axis represents channels, and the z-axis represents time (seconds). The increase in phase at peak 302 illustrates a freezing point along the fiber, whereas the decrease in phase at peak 304 illustrates a previously frozen point along the fiber that is starting to cool down. In this example, the processing flow converged after approximately one minute of recording and detected a difference of 32 meters between the two locations. The real difference between the two locations in this example was approximately 33 meters. The detection algorithm was able to identify 302 as the true event and discard 304 automatically.

Figure 4:
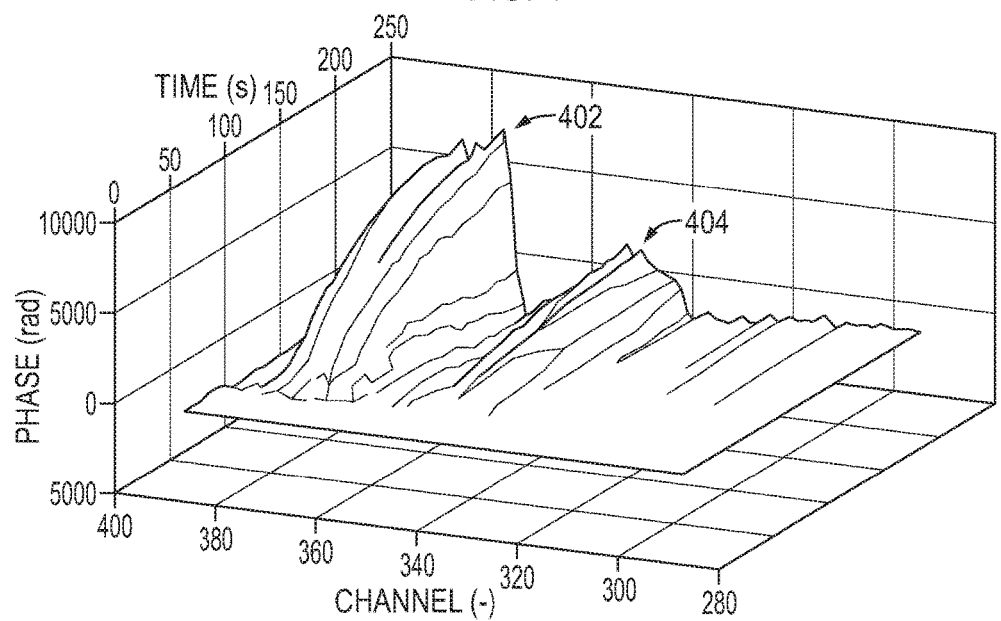
FIG. 4 is an example of a plot to identify the center of energy of low frequency phase components caused by a calibration event, that can be used to identify reference points for a channel-depth calibration scale, according to an embodiment.

FIG. 4 illustrates another example of DVS/DAS phase data obtained using the processing flow of FIG. 2. In this example, the optical fiber was contained within a Hybrid Wireline Hepta-Cable and was deployed in an environment in which other strong low frequency events were present, i.e., strong wind and cold temperatures. Again, in this example, the y-axis represents phase (rads) of the DVS/DAS data, the x-axis represents channels and the y-axis represents time (seconds). Two thermal sources (i.e., pipe freezing cans) were used to generate thermal events at two known locations along the fiber optic cable. To lessen the effects of the environmental low frequency events on the processed data, the cable was wrapped in foam and manually held at the two known locations while the calibration events occurred. As can be seen in FIG. 4, the processing of the DVS/DAS data reveals two centers of energy 402, 404 of the phase data, which corresponds to the locations of the two freezing points. In this example, each of the peaks 402, 404 includes two smaller peaks, simply as a consequence of using two thermal sources at each of the two locations along the fiber. The detection algorithm converged after two minutes of recording and provided an estimated difference between the two locations of about 36 meters. The actual distance between the two locations in this example was approximately 35 meters.

In other embodiments, the calibration source 122 can be configured as a remotely activated device that produces a temperature change having a known temperature signature. For example, the calibration source 122 can be deployed to a known location along the fiber 110 and a slow temperature chirp with a known signature can be remotely activated and the DVS/DAS data acquired. The low-frequency content of the DVS/DAS data can then be correlated with the known temperature signature of the calibration source 122. Using a calibration source 122 with a known signature can reduce the impact that ambient sources of vibration and temperature have on the DVS/DAS measurement and can facilitate the detection of the applied thermal event by giving it a known wavelet. Because the correlated temperature event grows stronger and is limited in time, cleaning of the event in the low-frequency DVS/DAS data can be facilitated using a 2D order filter, as an example. Once cleaned, the event then can be used to determine the location along the fiber 110 using the processing flow as presented above.

In other embodiments, the calibration source 122 can include a vibration source that can generate a vibration event at the location at which the source 122 is deployed. The vibration event, such as a chirp, can be locally or remotely activated and can have a known vibration signature over a limited length of the fiber. Correlating the DVS/DAS data with the known vibration signature again reduces the impact of ambient sources of vibration on the data, facilitates detection of the vibration event, and leads to determining the location of the event with precision using the center of energy of the high-pass or low-pass filtered DVS/DAS phase data. Because the vibration signature becomes stronger and is limited in time, a 2D order filter again provides for easy cleaning of the signature in the phase data. Once cleaned, the vibration signature then can be used to determine the location of the vibration event using the processing flow presented above.

In yet other embodiments, changes in temperature and strain experienced by the optical fiber 110 due to natural phenomena also can be used to determine a location along the fiber 110, such as the location of the far end 114 of the fiber 110 or the location where the fiber 110 extends through the wellhead 112 in a borehole application. In such an application, when the fiber optic cable 110 is deployed in the borehole 104, different sections of the cable 110 will be subjected to different levels of temperature and vibration. For example, the section of the cable 110 that is suspended between sheave wheels at the wellhead 112 will experience air currents and wind-induced vibration. Another section of the same cable 110 that is in a wellbore filled with static liquid will experience smaller and/or slower changes in temperature and vibration than the section that is surrounded by air. The differences between the vibration and temperature experienced by the different sections of fiber 110 can be quantified in order to estimate the location of the wellhead 112.

Figure 5:
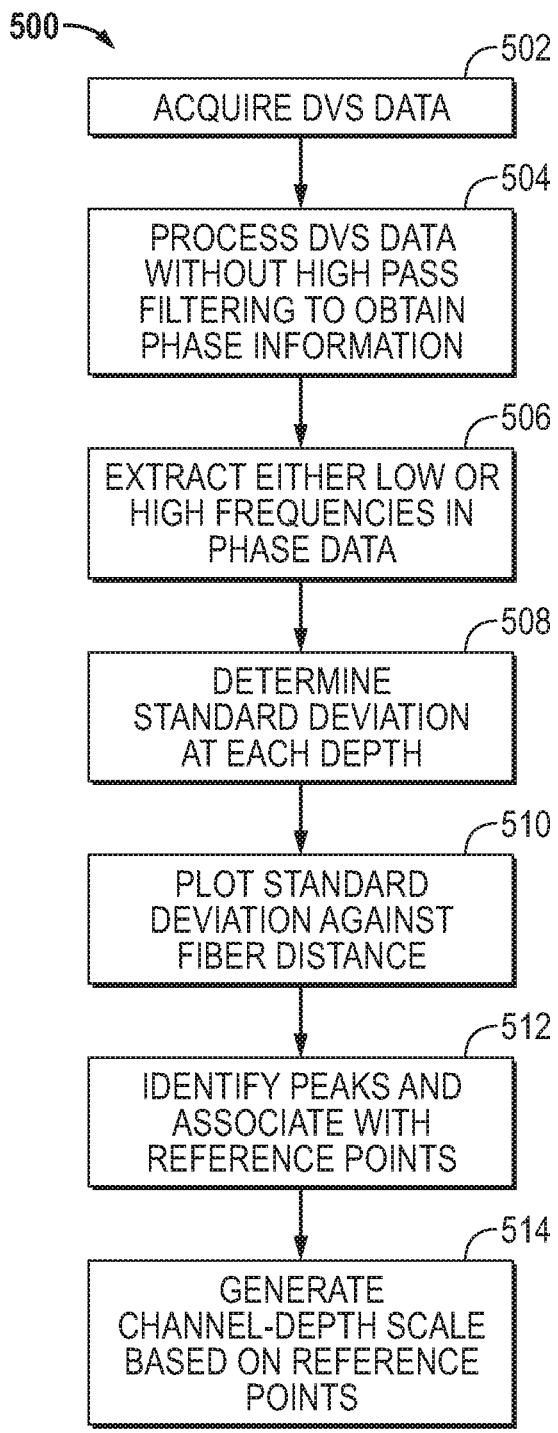
FIG. 5 is an example of a process flow for generating a channel-depth calibration scale, according to an embodiment.

An exemplary processing flow 500 to estimate the location of the wellhead 112 is illustrated in FIG. 5. At block 502, the DVS/DAS data is acquired and, at block 504, the data is processed to extract the phase information without any high pass filtering of the data. At block 506, the data is low pass filtered so that only the low frequency components of the data remain, or high pass filtered to extract only the high frequency components of the data, depending on the characteristics of the natural phenomena that needs to be identified. For example, the data can be low pass filtered at 1 Hz, although other appropriate filter frequencies can be employed as may be suitable for the particular application for which the data is acquired. At block 508, the standard deviation of phase at each depth is determined across a selected time window of the data record. As an example, the standard deviation at each depth across a record of approximately one minute can be determined. At block 510, the determined standard deviation then can be plotted against distance along the cable. At block 512, peaks in the standard deviations are identified and associated with at least two reference points along the optical fiber. At block 514, a channel-depth calibration scale is generated based on the two reference points.

Figure 6:
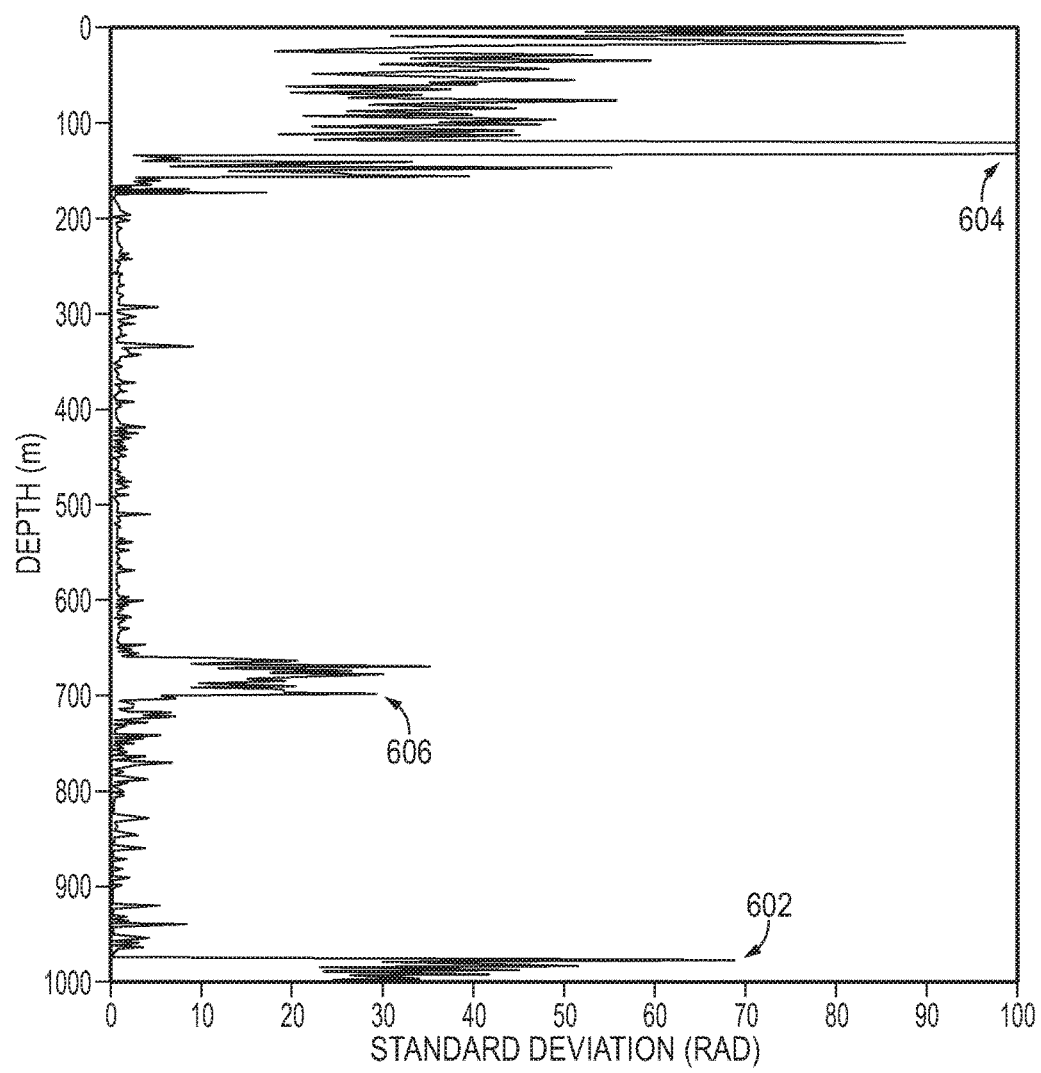
FIG. 6 is an example of a plot of standard deviation of phase versus depth resulting from a calibration event, that can be used to identify reference points for a channel-depth calibration scale, according to an embodiment.

FIG. 6 is an exemplary plot showing an example of standard deviation of the phase above 2 Hz versus depth in meters. In this example, the data was acquired using DVS/DAS instrumentation. The zero-meter location in the example corresponds to the location of the DVS/DAS instrumentation.

The example plot of FIG. 6 reveals three depth ranges over which the standard deviation of the phase is elevated, implying that the vibration energy is high. The peak 602 at around 1000 meters is caused by the far end 114 of the fiber 110. This peak 602 is detectable provided the DVS/DAS data is recorded for a slightly longer length than the length needed to cover the entire installed length of the optical fiber 110 in the borehole 104. Thus, if the absolute depth of the far end 114 of the fiber 110 is known, the peak 602 provides the first reference point for generating a calibrated channel-depth scale for the DVS/DAS data.

With reference still to FIG. 6, the broad peak 604 before 180 meters is partially caused by logging data before the start of the fiber 110 and partially because the first section of fiber 110 was loose inside the wireline unit, and so subject to changes in temperature and strain.

The peak 606 between 650 meters and 700 meters corresponds to the section of the fiber optic cable 110 suspended in the air between the wireline unit, sheaves and the wellhead 112. This section of cable 110 is subject to large amplitude changes in strain and temperature at low frequency, primarily due to air flow over the cable 110. The furthest extent of the peak 606 in the low frequency energy occurs at the location of the cable 110 where it passes through the wellhead 112. Thus, the location of the cable 110 that corresponds to the wellhead 112 can be detected by applying a threshold to the data. In some embodiments, the cable 110 can be restrained (e.g., clamped) at the wellhead 112 in order to provide a significant difference between the signal observed for the section of the fiber 110 that is in air and the signal observed for the section of the fiber 110 that is in the wellbore 104. As a result of this process flow, two reference points along the optical fiber 110 can be determined: a first reference point corresponding to the end 114 of the fiber 110 and a second reference point corresponding to the wellhead 112. A channel-depth scale can be derived from these two reference points. The channel-depth scale then can be used to associate data acquired from the optical fiber with specific depths in the wellbore 104.

In embodiments, the location of the end 114 of the fiber provides a reference point that can be used to generate the channel-depth scale. The location of the fiber end 114, which is at a known depth in the wellbore 104, can be discerned in the DVS/DAS data using various techniques to detect the transition between the fiber end 114 and the wellbore 104. As an example, FIG. 7 illustrates an example processing flow 700 that can be used to determine the location of the fiber end 114 in the DVS/DAS data. In blocks 702 and 704, DVS/DAS data is acquired and processed to obtain the phase information using any of the DVS/DAS systems and techniques described above. In block 706, the root mean square (RMS) of the phase data is determined for each channel, and an edge-preserving smoothing algorithm is applied to the data in block 708 to enhance the transition between the wellbore 104 and the fiber end 114. As an example, the edge-preserving smoothing algorithm can employ an N-points moving standard deviation window or other known techniques that can be applied to the data to smooth an image while preserving distinct edges. In blocks 710 and 712, an energy break detection algorithm is used to identify the location of the fiber end 114. As an example, the energy break detection algorithm can employ an STA/LTA (short-term average/long-term average) ratio technique or other known techniques to detect a break location in the data. At block 714, the identified location, combined with the known depth of the fiber end 114, then can be used to generate a channel-depth scale.

In another embodiment, the location of the fiber end 114 can be identified from the optical data (i.e., the backscattered signal) itself. This technique can provide a more accurate estimate of the location of the fiber end 114 since the optical signal is not subjected to the initial DVS/DAS processing.

As an example, FIG. 8 illustrates a processing flow 800 that can be used to determine the location of the fiber end 114 using the optical data. In block 802, the DVS/DAS data is acquired. In block 804, the acquired data is converted into an amplitude metric, such as by using a Hilbert Transform as an example. In blocks 806 and 808, an energy break detection algorithm is used to identify a potential channel that corresponds to the fiber end 114. In block 810, the processes in blocks 802, 804, 806 and 808 are repeated for multiple shot records at different acquisition times. At block 812, the results are aggregated to identify the statistical uncertainty in the estimate of the location of the fiber end 114. At block 814, the aggregated results are used to provide an estimate of the fiber end 114 location. The estimate can be corrected by compensating for the optical delays in the DVS/DAS instrument. At block 816, the channel that corresponds to the fiber end 114 location is used in conjunction with the known depth of the fiber end 114 to generate a channel-depth scale.

Figure 9:
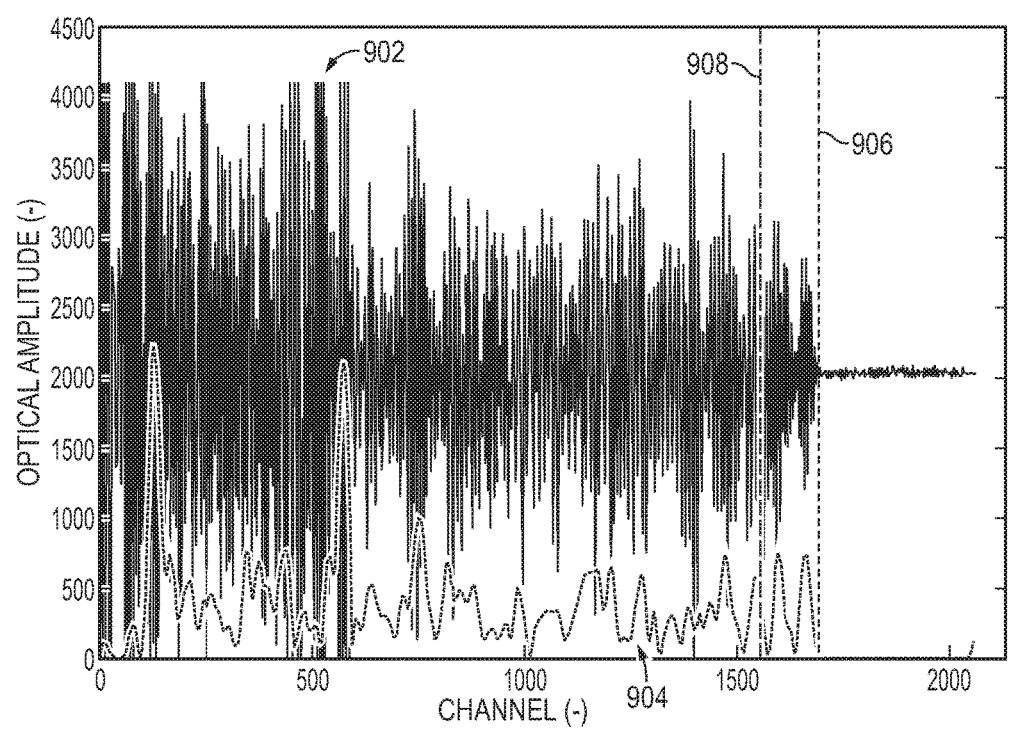
FIG. 9 is an example of a plot of a signal metric versus channel that can be used to identify an end of fiber reference point for a channel-depth calibration scale, according to an embodiment.

FIG. 9 illustrates a plot of example results provided by the process flow 800. The vertical axis of the plot represents an amplitude metric of the optical data, and the horizontal axis represents channels. Trace 902 corresponds to the optical data, and trace 904 corresponds to the amplitude metric associated with trace 902. Line 906 corresponds to the energy break location detected after aggregation of the individual results. Line 908 corresponds to the energy break location after correction for the optical delays of the DVS/DAS instrument. Line 908 also identifies to the channel that corresponds to the location of the fiber end 114, as identified by the process flow 800.

Instructions for performing the process flows 200, 500, 700 and 800, or portions of those process flows, can be stored in the memory devices 128 and executed by the processing devices 126 in the processing subsystem 124 of the DVS/DAS interrogation and acquisition system 116. In some embodiments, the DVS/DAS data may be stored in a memory device 128 of the DVS/DAS system 116 and then transmitted or conveyed to a remote location where the process flows 200, 500, 700 or 800 can be performed at a later time. It should be understood that the various processing blocks of the process flows 200, 500, 700 and 800 shown in FIGS. 2, 5, 7 and 8 are exemplary only and that the flows may include other, fewer or additional processing blocks. Yet further, certain of processing blocks of the flows 200, 500, 700 and 800 can be performed in parallel rather than serially as illustrated in the Figures.

A channel-depth calibration scale generated according to any of the techniques described above can be applied to DVS/DAS data to determine the locations or depths of events of interest. As mentioned above, borehole seismic surveying is an example of an application in which the techniques described herein can be particularly useful, i.e., the channel-depth calibration scale can be used to calibrate the DVS/DAS seismic data in order to identify the locations of acoustic events that are monitored by the fiber optic sensor. In general, seismic surveying employs seismic sources to generate seismic signals that are propagated into the subterranean formation. As an example, a seismic surveying source can be lowered into the borehole and activated by control signals from the surface in order to generate seismic signals that are transmitted into the subterranean formation. The propagated seismic signals are reflected from subterranean elements in the formation, and the reflected signals can be detected by a distributed fiber optic sensor.

In some embodiments, the seismic source used for the survey can be lowered to a location in the wellbore 104 that is below the fiber end 114. In such embodiments, a vibration isolation device, such as a packer or other isolating device, can be positioned above the seismic surveying source in order to acoustically decouple the source from the fiber optic sensor. Consequently, the acoustic events detected by the fiber sensor will primarily be the acoustic reflections from the subterranean elements rather than the signals generated by the seismic surveying source. The data collected by the seismic sensor can then be processed to determine characteristics of the subterranean structure, and the channel-depth calibration scale can be applied to the data to determine the locations of those characteristics.

In some embodiments, the systems and techniques described herein may be employed in conjunction with an intelligent completion system disposed within a well that penetrates a hydrocarbon-bearing earth formation. Portions of the intelligent completion system may be disposed within cased portions of the well, while other portions of the system may be in the uncased, or open hole, portion of the well. The intelligent completion system can comprise one or more of various components or subsystems, which include without limitation: casing, tubing, control lines (electric, fiber optic, or hydraulic), packers (mechanical, sell or chemical), flow control valves, sensors, in flow control devices, hole liners, safety valves, plugs or inline valves, inductive couplers, electric wet connects, hydraulic wet connects, wireless telemetry hubs and modules, and downhole power generating systems. Portions of the systems that are disposed within the well can communicate with systems or sub-systems that are located at the surface. The surface systems or sub-systems in turn can communicate with other surface systems, such as systems that are at locations remote from the well.

While the present disclosure has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the invention.

What is claimed is:

1. A method for operating a DVS system, comprising:
deploying a DVS system to monitor acoustic signals in a wellbore, the DVS system including an optical fiber sensor that responds continuously along its length to the acoustic signals, wherein the optical fiber sensor extends through a wellhead and into the wellbore;
operating the DVS system to acquire DVS data;
processing the DVS data to identify at least a first reference point and a second reference point along a length of the optical fiber sensor,
wherein processing includes processing low frequency components of the DVS data to identify the first reference point by detecting an interface between an environmental condition experienced by the optical fiber sensor above the wellhead and an environmental condition experienced by the fiber optic sensor below the wellhead, and to identify a second reference point corresponding to a known depth of a far end of the optical fiber sensor in the wellbore; and generating a channel-depth calibration scale to apply to the DVS data based on the determined first and second reference points.

2. The method as recited in claim 1, wherein processing the DVS data comprises extracting phase information of the low frequency content and determining a standard deviation of the phase information at various positions along the optical fiber sensor.

3. The method as recited in claim 2, wherein identifying the first and second reference points includes identifying positions along the optical fiber sensor at which the standard deviation exceeds a predetermined threshold.

4. The method as recited in claim 1, wherein the environmental condition is at least one of an ambient temperature change and a dynamic strain.

5. A distributed vibration sensing (DVS) system, comprising:
an optical fiber disposed in a borehole to monitor acoustic events;
an optical source to launch optical signals into a launch end of the optical fiber;
a detector to detect backscattered light generated by the optical fiber in response to the launched optical signals;
a calibration source to apply a localized calibration event at a first location along a length of the optical fiber, wherein the localized calibration event is a temperature change; and
a processing system to process detected backscattered light that is generated by the optical fiber while the localized calibration event is present at the first location in order to determine a channel-depth calibration scale for the optical fiber.

6. The system as recited in claim 5, wherein the calibration source further applies a second localized calibration event at a second location along the optical fiber, and wherein the processing system further processes detected backscattered light that is generated by the optical fiber while the second localized calibration event is present at the second location in order to determine the channel-depth calibration scale for the optical fiber.

7. The system as recited in claim 5, wherein the backscattered light generated while the first calibration event is present includes phase information having specified frequency components, and wherein the processing system determines a center of energy of the specified frequency components.

8. The system as recited in claim 5, wherein the calibration source applies the first calibration event at a wellhead of a well.

9. The system as recited in claim 5, wherein the calibration source has a known signature, and wherein the processing system processes the backscattered light to detect the known signature.

10. The system as recited in claim 9, wherein the known signature is cleaned by applying a 2D order filter.

11. The system as recited in claim 5, wherein the optical fiber having a far end positioned at a known depth in a well, and wherein the processing system is configured to process detected backscattered light that is generated by the optical fiber order to identify at least a first reference point and a second reference point along the length of the optical fiber, wherein the first reference point corresponds to a wellhead of the well and the second reference point corresponds to the far end of the optical fiber, and wherein the first reference point is identified by detecting a difference between an ambient condition experienced by the optical fiber above and below the wellhead, wherein the first and second reference points are used to generate a channel-depth calibration scale to determine a depth of an acoustic event monitored by the optical fiber.

12. The system as recited in claim 11, wherein the ambient condition is at least one of a temperature change and a dynamic strain.

* * * * *